United States Patent
Sakamoto et al.

(10) Patent No.: US 6,606,284 B1
(45) Date of Patent: Aug. 12, 2003

(54) GAIN CONTROLLING APPARATUS AND METHOD, INFORMATION REPRODUCING APPARATUS AND METHOD, AND INFORMATION RECORDING APPARATUS AND METHOD

(75) Inventors: Masato Sakamoto, Kawagoe (JP); Katsunori Tamamura, Kawagoe (JP); Kazuhiko Oogami, Kawagoe (JP); Norikazu Tada, Tendo (JP); Atsushi Kusaka, Tendo (JP); Akihito Fujiwara, Tendo (JP); Mayumi Takahashi, Kawagoe (JP)

(73) Assignees: Pioneer Corporation, Tokyo-To (JP); Tohoku Pioneer Corporation, Yamagata-Ken (JP)

(*) Notice: Subject to any disclaimer, the term of this patent is extended or adjusted under 35 U.S.C. 154(b) by 0 days.

(21) Appl. No.: 09/444,571

(22) Filed: Nov. 19, 1999

(30) Foreign Application Priority Data

Nov. 19, 1998 (JP) .......................................... 10-330022

(51) Int. Cl.⁷ .............................................. G11B 7/095
(52) U.S. Cl. ................................ 369/44.29; 369/44.36; 369/53.22; 369/53.28; 369/124.11
(58) Field of Search ................. 369/44.29, 44.35–44.36, 369/53.2, 53.22, 59.15, 124.1–124.11, 53.28

(56) References Cited

U.S. PATENT DOCUMENTS

| | | | |
|---|---|---|---|
| 4,967,404 A | | 10/1990 | Orlicki et al. |
| 5,146,443 A | * | 9/1992 | Iwase et al. ............. 369/44.29 |
| 5,886,963 A | * | 3/1999 | Abe et al. ................. 369/44.35 |
| 6,192,011 B1 | * | 2/2001 | Kiyoura et al. .......... 369/44.29 |

FOREIGN PATENT DOCUMENTS

| | | |
|---|---|---|
| EP | 0 247 829 A1 | 12/1987 |
| EP | 0 388 519 A2 | 9/1990 |
| EP | 0 388 555 A2 | 9/1990 |
| EP | 0 446 412 A2 | 9/1991 |

OTHER PUBLICATIONS

Patent Abstracts of Japan, vol. 2000, No. 1, Jan. 31, 2000, for JP 11–273285.*
Patent Abstracts of Japan, vol. 12, No. 497, Dec. 26, 1988, for JP 63–205863.*
Patent Abstracts of Japan, vol. 8, No. 275, Dec. 15, 1984, for JP 59–140673.*
Patent Abstracts of Japan, vol. 10, No. 188, Jul. 3, 1986, for JP 61–32225.*
Patent Abstracts of Japan, vol. 17, No. 573, Oct. 19, 1993, for JP 5–165528.*

* cited by examiner

Primary Examiner—W. R. Young
(74) Attorney, Agent, or Firm—Young & Thompson

(57) ABSTRACT

A gain controlling apparatus includes a pre-amplifier for roughly adjusting a gain of a generation signal, which is generated on the basis of a reception signal from an optical disc; a variable amplifier for finely adjusting the gain on the basis of the roughly adjusted gain by the pre-amplifier; a memory for storing a plurality of values for adjusting the gain generated during a previous occasion of gain adjustment in time series; and a controlling device for controlling the pre-amplifier at a current occasion of gain adjustment on the basis of the respective stored values for adjusting the gain and controlling the variable amplifier, wherein the controlling device comprises a predicting device for predicting a current adjustment value, namely an adjusted value for the gain roughly adjusted at the current occasion by the pre-amplifier, and the controlling device controls the pre-amplifier on the basis of the predicted current adjustment value.

16 Claims, 7 Drawing Sheets

GAIN CONTROLLING APPARATUS AND METHOD, INFORMATION REPRODUCING APPARATUS AND METHOD, AND INFORMATION RECORDING APPARATUS AND METHOD

BACKGROUND OF THE INVENTION

1. Field of the Invention

The present invention relates to a gain controlling apparatus and a gain controlling method, an information reproducing apparatus having the gain controlling apparatus and an information reproducing method having the gain controlling method, and an information recording apparatus having the gain controlling apparatus and an information recording method having the gain controlling method. More particularly, the present invention relates to a gain controlling apparatus for controlling a gain of a signal used for a reproducing control or a recording control when at least one of an information reproducing operation and an information recording operation is optically carried out from and onto an information recording medium such as an optical disc and the like, and a gain controlling method for controlling it, an information reproducing apparatus having the gain controlling apparatus and an information reproducing method having the gain controlling method, and an information recording apparatus having the gain controlling apparatus and an information recording method having the gain controlling method.

2. Description of the Related Art

Conventionally, if information is optically reproduced or recorded as mentioned above, a light beam, such as a laser light for the reproduction or the record and the like, is irradiated onto an information recording medium such as an optical disc or the like, and then a signal generated by receiving its reflection light is used to usually carry out various controls or reproducing processes or recording processes.

More concretely, the conventional information reproducing apparatus or information recording apparatus has the following configuration. For example, a light detection signal generated by receiving the reflection light is processed to generate a so-called focus error signal (namely, a focus error signal indicative of a deviation in a direction perpendicular to an information recording medium at a focal position of a light beam) or a tracking error signal (namely, a tracking error signal indicative of a deviation in a direction parallel to the information recording medium at a focal point of a light beam). Based on this, the focal point is servo-controlled in the perpendicular or parallel direction to accurately reproduce or record the information.

In this case, the respective servo controls are carried out by optimizing a gain (or a sensibility) in the focus error signal or the tracking error signal in response to a strength of the obtained reflection light. Here, the reason why the gain is optimized is that the extremely high gains of the respective error signals may cause the mechanism of the servo control to oscillate in the worst case. Thus, the servo control cannot be carried out. On the other hand, the extremely low gains may disable the respective error signals to function as the error signals.

Even if the information is reproduced on the basis of a reproduction signal generated by receiving the reflection light (actually, on the basis of a reproduction RF (Radio Frequency) signal corresponding to the information recorded on an information recording medium and the like), it is usual to adjust a gain of the reproduction signal so as to be suitable for the reproducing process.

For example, if the contamination of the surface of an objective lens within an optical pickup and the like causes the strength of the light detection signal generated by the reception of the reflection light to be reduced in conjunction with a temporal elapse, the above-mentioned gain adjustment is required to compensate the drop of the gain of the reproduction signal resulting from the reduction of the strength.

Conventionally, in order to mainly shorten the adjustment times, as for the above-mentioned adjustments of the gains of the respective signals, a rough adjustment (this actually implies an adjustment using a rough adjustment unit over a wide gain range, and this is hereafter used in the same meaning) is transiently performed on the gains of the respective input signals. Based on the result of this rough adjustment, a fine adjustment (this actually implies an adjustment that a gain after the rough adjustment is adjusted by using a carefully thought out adjustment unit as compared with an adjustment unit of the rough adjustment, with regard to a range of a gain which contains the gain after the rough adjustment and is narrower than a range of a gain of the rough adjustment) is further carried out to accordingly obtain an adjusted value of a desired gain for each signal.

Here, the rough and fine adjustments are further actually described. For example, supposing that in one signal a range of a gain to be finely adjusted is a range of ±6 dB, if a value of a gain after the fine adjustment is greater than +6 dB with respect to an initial value of the gain of the one signal, it is determined that a gain control in the rough adjustment immediately before is not adequate. At a next gain adjustment timing, the gain is increased in advance by +6 dB with respect to the initial value of the gain at a time of the rough adjustment. In the fine adjustment after that, the fine adjustment is repeated in the range of ±6 dB.

When as for the one signal, a range of a gain to be finely adjusted is similarly assumed to be ±6 dB, if a value of the gain after the fine adjustment is lower than −6 dB with respect to the initial value of the gain of the one signal, it is determined that the gain control in the rough adjustment immediately before is not similarly adequate. At a next gain adjustment timing, the gain is decreased in advance by −6 dB with respect to the initial value of the gain in the rough adjustment. In the fine adjustment after that, the fine adjustment is repeated in the range of ±6 dB.

However, in a case of the adjusting method composed of the combination of the above-mentioned rough and fine adjustments, whenever the rough adjustment is once carried out, it is always necessary to use its result to accordingly carry out the fine adjustment. This implies that if an adjusted value in the rough adjustment is frequently changed at a minor temporal interval, the fine adjustment is repeated in conjunction with the change. This results in an increase of the entire adjustment time duration, which brings about a problem that it takes a wasteful time to proceed to a next process (namely, an actual reproducing or recording process, or the like).

On the other hand, if the number of rough adjustments is reduced by widening the adjustment range in the rough adjustment so as to solve this problem, it takes a long time to carry out the fine adjustment associated with the reduction (namely, the reduction of the number of rough adjustments brings about the expansion of a range of a gain to be finely adjusted. Thus, the time duration required for the fine adjustment is increased). This results in a problem that a time as the entire adjustment time duration is not shorten.

SUMMARY OF THE INVENTION

The present invention is proposed in view of the above mentioned problems. It is therefore an object of the present invention to provide a gain controlling apparatus and method, an information reproducing apparatus and method and an information recording apparatus and method, which can shorten a gain adjustment time duration without dropping the adjustment accuracy.

The above object of the present invention can be achieved by a gain controlling apparatus provided with: a roughly adjusting device such as a pre-amplifier or the like for roughly adjusting a gain of a generation signal, which is generated on the basis of a light detection signal obtained by receiving a reflection light of a light beam from an information recording medium such as an optical disc or the like; a finely adjusting device such as a variable amplifier or the like for finely adjusting the gain on the basis of a result of roughly adjusting the gain by the roughly adjusting device; a memory device such as a memory or the like for storing a plurality of values of the generation signal generated until a previous occasion of gain adjustment in time series; and a controlling device such as a CPU or the like for controlling the roughly adjusting device to roughly adjusting the gain at a current occasion of gain adjustment on the basis of the respective stored values of the generation signal and also controlling the finely adjusting device to finely adjust the gain on the basis of a result of roughly adjusting the gain at the current occasion by the roughly adjusting device.

According to the gain controlling apparatus of the present invention, at first, the gain at the current occasion is roughly adjusted by the roughly adjusting device, on the basis of the respective stored values of the generation signal. Then, the gain is finely adjusted by the finely adjusting device, on the basis of a result of the rough adjustment of the gain at the current occasion. Thus, it is possible to roughly adjust the gain with predicting the change in the value of the generation signal in advance, followed by the fine adjustment. Accordingly, such a possibility is increased that the adjustment value at the previous occasion can be used as it is for the rough adjustment at the current occasion, followed by the fine adjustment. Consequently, it is possible to effectively prevent the increase of the time duration required for the gain adjustment due to a frequent change of the rough adjustment value for each occasion of the rough adjustment, while keeping the adjustment accuracy high.

In this manner, in case of reproducing or recording the information from or onto the information recording medium, it is possible to prevent the increase of the time duration required for the gain adjustment, and reproduce or record the information precisely and speedily.

In one aspect of the gain controlling apparatus of the present invention, the controlling device is provided with a predicting device such as a CPU or the like for predicting a current adjustment value, which is an adjusted value for the gain roughly adjusted at the current occasion by the roughly adjusting device. The controlling device controls the roughly adjusting device to roughly adjust the gain at the current occasion on the basis of the predicted current adjustment value.

According to this aspect, since the current adjustment value is predicted by using the values of the generation signal at the past occasions, which are accumulated in time series in the memory, and since the gain is roughly adjusted on the basis of this predicted value, it is possible to effectively prevent the increase of the time duration required for the gain adjustment while keeping the adjustment accuracy high.

In this aspect of having the predicting device, the current adjustment value may be predicted when adjusting the gain at the previous occasion.

By constructing in this way, since the rough adjustment at the current occasion is performed by using the current adjustment value which was predicted and set at the previous occasion, it is not necessary to newly set the adjustment value at the current occasion. Consequently, it is possible to further shorten the time duration required for the gain control at the current occasion.

In this aspect of having the predicting device, the gain may be changed in conjunction with a change of a characteristic of the reflection light. The predicting device may be provided with: a correlation parameter generating device such as a CPU or the like for generating a correlation parameter having a correlation with the reflection light by using a correlation generation signal, which is the generation signal having a characteristic correlated with the characteristic of the reflection light; and a change parameter generating device such as a CPU or the like for generating a change parameter indicative of an aged change of the characteristic of the reflection light by using each correlation parameter corresponding to the respective one of the stored values of the generation signal. The predicting device may predict the current adjustment value for the gain, on the basis of the generated change parameter.

By constructing in this way, since the current adjustment value is predicted while generating the correlation parameter and the change parameter respectively, it is possible to predict the current adjustment value more precisely and prevent the increase of the time duration required for the gain control in conjunction with the change in the characteristic of the reflection light.

In this case, the information recording medium may be recorded with information by forming a record track. The correlation generation signal may be at least one of a detection signal corresponding to the information and an error signal indicative of a deviation from the record track at an irradiation position of the light beam on the information recording medium.

By constructing in this way, since the correlation parameter and the change parameter are generated on the basis of the detection signal and/or the error signal, each having a strong correlation with the reflection light, it is possible to more precisely grasp the change in the gain to be adjusted due to the aged change in the characteristic of the reflection light, to thereby adjust the gain.

In this case further, the information recording medium may be shaped in a disc, and the error signal may be at least one of a tracking error-signal indicative of a deviation from the record track in a radial direction of the information recording medium at the irradiation position and a focus error signal indicative of a deviation from the record track in a direction perpendicular to the information recording medium at the irradiation position.

By constructing in this way, in case of reproducing or recording the information from or onto the information recording medium shaped in a disc e.g., an optical disc, it is possible to more precisely grasp the change in the gain to be adjusted due to the aged change in the characteristic of the reflection light, to thereby adjust the gain.

Alternatively in this case further, the information recording medium may be shaped in a disc, and the error signal may be at least one of (i) a first gain signal which indicates a gain in a tracking servo control using a tracking error signal indicative of a deviation from the record track in a radial direction of the information recording medium at the irradiation position and (ii) a second gain signal which indicates a gain in a focus servo control using a focus error signal indicative of a deviation from the record track in a direction perpendicular to the information recording medium at the irradiation position.

By constructing in this way, in case of reproducing or recording the information from or onto the information recording medium shaped in a disc e.g., an optical disc, it is possible to more precisely grasp the change in the gain to be adjusted due to the aged change in the characteristic of the reflection light, to thereby adjust the gain.

The above object of the present invention can be also achieved by an information reproducing apparatus provided with (i) the above described gain controlling apparatus of the present invention (including its various aspects), (ii) an optical pickup device such as an optical pickup or the like for irradiating the light beam onto the information recording medium and receiving the reflection light to thereby output the light detection signal, (iii) a signal generating device such as an adder or the like for generating the generation signal on the basis of the light detection signal outputted from the optical pickup device, and (iv) a reproduction controlling device such as a CPU or the like for controlling a reproduction of the information in accordance with the generation signal, the gain of which is roughly and finely adjusted.

According to the information reproducing apparatus of the present invention, it is possible to speedily reproduce the information from the information recording medium while shortening the time duration required for the gain control for the generation signal.

The above object of the present invention can be also achieved by an information recording apparatus provided with (i) the above described gain controlling apparatus of the present invention (including its various aspects), (ii) an optical pickup device such as an optical pickup or the like for irradiating the light beam onto the information recording medium and receiving the reflection light to thereby output the light detection signal, (iii) a signal generating device such as an adder or the like for generating the generation signal on the basis of the light detection signal outputted by the optical pickup device, (iv) a reproducing device such as a DSP (Digital Signal Processor) or the like for reproducing the information from the information recording medium on the basis of the generation signal, the gain of which is roughly and finely adjusted, and (v) a recording device such as an encoder or the like for processing record information, which is to be recorded onto the information recording medium, on the basis of the reproduced information and recording the processed record information onto the information recording medium.

According to the information recording apparatus of the present invention, it is possible to speedily record the information onto the information recording medium while shortening the time duration required for the gain control for the generation signal.

The above object of the present invention can be also achieved by a gain controlling method including: a roughly adjusting process of roughly adjusting a gain of a generation signal, which is generated on the basis of a light detection signal obtained by receiving a reflection light of a light beam from an information recording medium such as an optical disc or the like; a finely adjusting process of finely adjusting the gain on the basis of a result of roughly adjusting the gain by the roughly adjusting process; a storing process of storing into a memory device a plurality of values of the generation signal generated until a previous occasion of gain adjustment in time series; and a controlling process of controlling the roughly adjusting process to roughly adjusting the gain at a current occasion of gain adjustment on the basis of the respective stored values of the generation signal and also controlling the finely adjusting process to finely adjust the gain on the basis of a result of roughly adjusting the gain at the current occasion by the roughly adjusting process.

According to the gain controlling method of the present invention, at first, the gain at the current occasion is roughly adjusted by the roughly adjusting process, on the basis of the respective stored values of the generation signal. Then, the gain is finely adjusted by the finely adjusting process, on the basis of a result of the rough adjustment of the gain at the current occasion. Thus, it is possible to roughly adjust the gain with predicting the change in the value of the generation signal in advance, followed by the fine adjustment. Accordingly, such a possibility is increased that the adjustment value at the previous occasion can be used as it is for the rough adjustment at the current occasion, followed by the fine adjustment. Consequently, it is possible to effectively prevent the increase of the time duration required for the gain adjustment due to a frequent change of the rough adjustment value for each occasion of the rough adjustment, while keeping the adjustment accuracy high.

In this manner, in case of reproducing or recording the information from or onto the information recording medium, it is possible to prevent the increase of the time duration required for the gain adjustment, and reproduce or record the information precisely and speedily.

In one aspect of the gain controlling method of the present invention, the controlling process includes a predicting process of predicting a current adjustment value, which is an adjusted value for the gain roughly adjusted at the current occasion by the roughly adjusting process, and the controlling process controls the roughly adjusting process to roughly adjust the gain at the current occasion on the basis of the predicted current adjustment value.

According to this aspect, since the current adjustment value is predicted by using the values of the generation signal at the past occasions, which are accumulated in time series in the memory, and since the gain is roughly adjusted on the basis of this predicted value, it is possible to effectively prevent the increase of the time duration required for the gain adjustment while keeping the adjustment accuracy high.

In this aspect of having the predicting process, the current adjustment value may be predicted when adjusting the gain at the previous occasion.

By constructing in this way, since the rough adjustment at the current occasion is performed by using the current adjustment value which was predicted and set at the previous occasion, it is not necessary to newly set the adjustment value at the current occasion. Consequently, it is possible to further shorten the time duration required for the gain control at the current occasion.

In this aspect of having the predicting process, the gain may be changed in conjunction with a change of a characteristic of the reflection light. The predicting process may include: a correlation parameter generating process of generating a correlation parameter having a correlation with the reflection light by using a correlation generation signal, which is the generation signal having a characteristic correlated with the characteristic of the reflection light; and a change parameter generating process of generating a change parameter indicative of an aged change of the characteristic of the reflection light by using each correlation parameter corresponding to the respective one of the stored values of the generation signal. The predicting process may predict the current adjustment value for the gain, on the basis of the generated change parameter.

By constructing in this way, since the current adjustment value is predicted while generating the correlation parameter and the change parameter respectively, it is possible to predict the current adjustment value more precisely and prevent the increase of the time duration required for the gain control in conjunction with the change in the characteristic of the reflection light.

In this case, the information recording medium may be recorded with information by forming a record track; and the correlation generation signal is at least one of a detection signal corresponding to the information and an error signal indicative of a deviation from the record track at an irradiation position of the light beam on the information recording medium.

By constructing in this way, since the correlation parameter and the change parameter are generated on the basis of the detection signal and/or the error signal, each having a strong correlation with the reflection light, it is possible to more precisely grasp the change in the gain to be adjusted due to the aged change in the characteristic of the reflection light, to thereby adjust the gain.

In this case further, the information recording medium may be shaped in a disc, and the error signal may be at least one of a tracking error signal indicative of a deviation from the record track in a radial direction of the information recording medium at the irradiation position and a focus error signal indicative of a deviation from the record track in a direction perpendicular to the information recording medium at the irradiation position.

By constructing in this way, in case of reproducing or recording the information from or onto the information recording medium shaped in a disc e.g., an optical disc, it is possible to more precisely grasp the change in the gain to be adjusted due to the aged change in the characteristic of the reflection light, to thereby adjust the gain.

Alternatively in this case further, the information recording medium may be shaped in a disc, and the error signal may be at least one of (i) a first gain signal which indicates a gain in a tracking servo control using a tracking error signal indicative of a deviation from the record track in a radial direction of the information recording medium at the irradiation position and (ii) a second gain signal which indicates a gain in a focus servo control using a focus error signal indicative of a deviation from the record track in a direction perpendicular to the information recording medium at the irradiation position.

By constructing in this way, in case of reproducing or recording the information from or onto the information recording medium shaped in a disc e.g., an optical disc, it is possible to more precisely grasp the change in the gain to be adjusted due to the aged change in the characteristic of the reflection light, to thereby adjust the gain.

The above object of the present invention can be also achieved by an information reproducing method including (i) the above described gain controlling method of the present invention (including its various aspects), (ii) an optical pickup process of irradiating the light beam onto the information recording medium and receiving the reflection light to thereby output the light detection signal, (iii) a signal generating process of generating the generation signal on the basis of the light detection signal outputted by the optical pickup process, and (iv) a reproduction controlling process of controlling a reproduction of the information in accordance with the generation signal, the gain of which is roughly and finely adjusted.

According to the information reproducing method of the present invention, it is possible to speedily reproduce the information from the information recording medium while shortening the time duration required for the gain control for the generation signal.

The above object of the present invention can be also achieved by an information recording method including (i) the above described gain controlling method of the present invention (including its various aspects), (ii) an optical pickup process of irradiating the light beam onto the information recording medium and receiving the reflection light to thereby output the light detection signal, (iii) a signal generating process of generating the generation signal on the basis of the light detection signal outputted by the optical pickup process, (iv) a reproducing process of reproducing the information from the information recording medium on the basis of the generation signal, the gain of which is roughly and finely adjusted, and (v) a recording process of processing record information, which is to be recorded onto the information recording medium, on the basis of the reproduced information and recording the processed record information onto the information recording medium.

According to the information recording method of the present invention, it is possible to speedily record the information onto the information recording medium while shortening the time duration required for the gain control for the generation signal.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings.

The following respective embodiments are the embodiment in which the present invention is applied to a gain control (in a first embodiment and a second embodiment) in an information reproducing apparatus for reproducing the information recorded on a CD (Compact Disc) or CD-RW (Compact Disc-Rewritable; CD in which a plurality of recording or reproducing operations can be carried out. It is known that a gain of a strength of a reflection light from the CD-RW is lower by about 12 dB than that of a reflection light from a typical CD), or a gain control (in a third embodiment) in an information recording apparatus for recording the information on the CD-RW.

(I) First Embodiment

At first, the first embodiment according to the present invention is described with reference to FIGS. 1 to 6.

Figure 1:
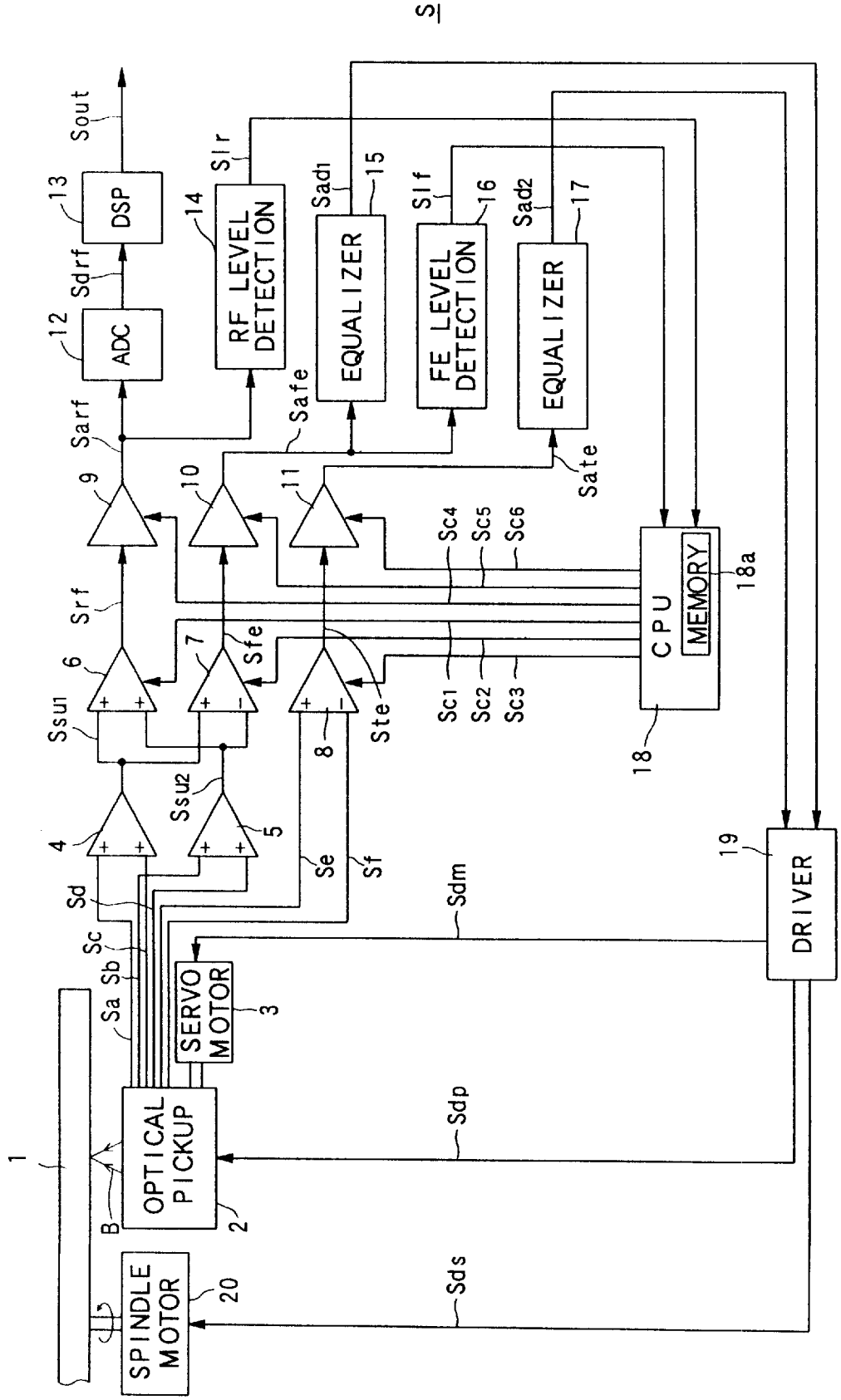
FIG. 1 is a block diagram showing a whole configuration of an information reproducing apparatus according to a first embodiment.
Figure 2:
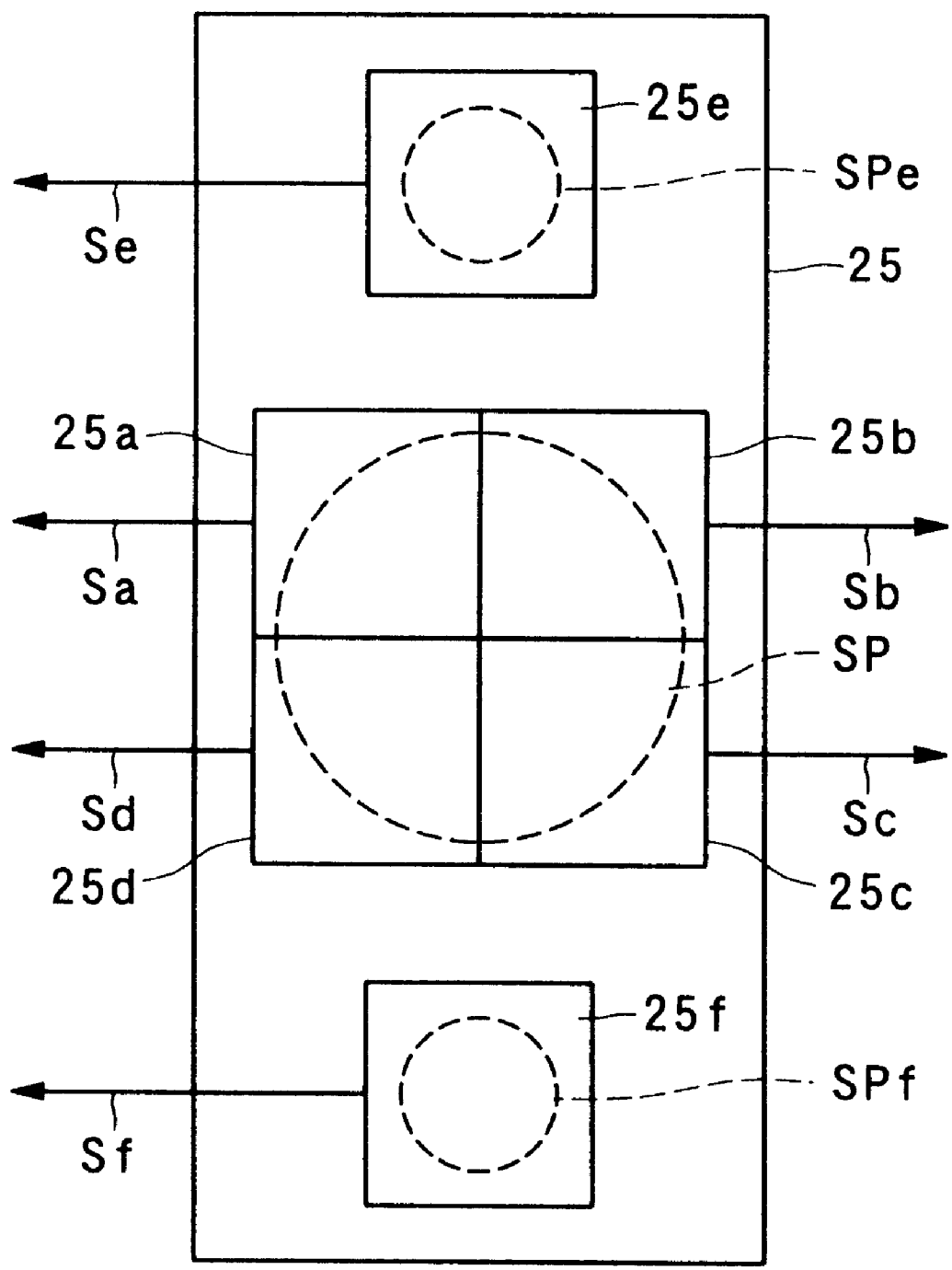
FIG. 2 is a plan view showing a configuration of a detector in the first embodiment.

At first, the whole configuration and the operations of the information reproducing apparatus according to the first embodiment are described with reference to FIGS. 1 and 2. FIG. 1 is a block diagram showing the whole configuration of the information reproducing apparatus according to the first embodiment. FIG. 2 is a plan view showing a configuration of a detector in a later-described optical pickup.

As shown in FIG. 1, an information reproducing apparatus S according to the first embodiment is provided with: an optical pickup 2; a servo motor 3; adders 4 and 5 serving as generators; pre-amplifiers 6 to 8 serving as roughly adjusting devices and generators; variable amplifiers 9 to 11 serving as finely adjusting devices; an A/D (Analog/Digital) converter 12; a DSP (Digital Signal Processor) 13 serving as a reproducing device; an RF level detection circuit 14; equalizers 15 and 17; an FE (Focus Error) level detection circuit 16; a CPU 18 serving as a controller, a predicting device, a correlation parameter generator, a change parameter generator and a reproduction controller; a driver 19; and a spindle motor 20.

The CPU 18 contains therein a memory 18a serving as a storing device. This memory 18a is a non-volatile type memory in which the stored content is not erased even if a power supply of the information reproducing apparatus S is turned off.

The optical pickup 2 is provided with: a detector 25 having partial detectors 25a to 25f as shown in FIG. 2; a diode (not shown) for emitting a light beam B shown in FIG. 1; an objective lens (not shown) for collecting the emitted light beams B onto an optical disc 1 shown in FIG. 1, and so on.

Next, the whole operation will be described below.

The spindle motor 20 is driven in accordance with a later-described spindle drive signal Sds from the driver 19, and accordingly rotates the optical disc 1 serving as an information recording medium on which information to be reproduced is recorded, at a predetermined rotation number.

At this time, the optical pickup 2 irradiates the light beam B serving as a main beam used for the information reproduction and two sub-beams (which are not shown and are intended to carry out a tracking servo control by using a so-called three-beam method) onto the information record surface of the optical disc 1, respectively. The optical pickup 2 receives respective reflection lights by the detector 25, and further outputs light detection signals Sa to Sf.

In this case, as shown in FIG. 2, the optical pickup 2 receives the reflection light of the light beam B (to which astigmatism is given in advance through a cylindrical lens (not shown) or the like in the optical pickup 2, in order to perform a focus servo control by using a so-called astigmatism method) by the partial detectors 25a to 25d, to thereby output the light detection signals Sa to Sd. The optical pickup 2 also separately receives the respective sub-beams by the respective partial detectors 25e and 25f, to thereby output the respective light detection signals Se to Sf. At this time, the light beam B is emitted such that an irradiation range on the partial detectors 25a to 25d of the reflection lights is an irradiation range SP shown in FIG. 2. Also, the respective sub-beams are emitted such that an irradiation range on the partial detectors 25e and 25f of the reflection lights is irradiation ranges SPe and SPf respectively shown in FIG. 2. Then, the light detection signals Sa to Sd are used to generate a later-described reproduction RF signal Srf and a focus error signal Sfe (i.e., a focus error signal generated by the astigmatism method). On the other hand, the light detection signals Se and Sf are used to generate a later-described tracking error signal Ste.

Next, the adder 4 adds the light detection signals Sa and Sc to thereby generate an addition signal Ssu1, and then outputs it to one terminal of the pre-amplifier 6 and a normal terminal of the pre-amplifier 7, respectively.

In parallel with this, the adder 5 adds the light detection signals Sb and Sd to thereby generate an addition signal Ssu2, and then outputs to the other terminal of the pre-amplifier 6 and an inversion terminal of the pre-amplifier 7, respectively.

Accordingly, the pre-amplifier 6 adds the addition signal Ssu1 and the addition signal Ssu2 to thereby generate the reproduction RF signal Srf corresponding to the information recorded on the optical disc 1, and then outputs it to the variable amplifier 9. At this time, the pre-amplifier 6 roughly adjusts a gain of the reproduction RF signal Srf, in accordance with a later-described control signal Sc1 from the CPU 18.

On the other hand, the pre-amplifier 7 subtracts the addition signal Ssu2 from the addition signal Ssu1 to thereby generate the focus error signal Sfe for the focus servo control of the astigmatism method, and then outputs it to the variable amplifier 10. At this time, the pre-amplifier 7 roughly adjusts a gain of the focus error signal Sfe, in accordance with a later-described control signal Sc2 from the CPU 18.

Moreover, the pre-amplifier 8 subtracts the light detection signal Sf from the light detection signal Se to thereby generate the tracking error signal Ste for the tracking servo control of the three-beam method, and then outputs it to the variable amplifier 11. At this time, the pre-amplifier 8 roughly adjusts a gain of the tracking error signal Ste, in accordance with a later-described control signal Sc3 from the CPU 18.

Next, the variable amplifier 9 finely adjusts the roughly-adjusted gain of the reproduction RF signal Srf, in accordance with a control signal Sc4 from the CPU 18 to thereby generate an adjusted RF signal Sarf, and then outputs it to the A/D converter 12 and the RF level detection circuit 14.

After that, the A/D converter 12 digitizes the adjusted RF signal Sarf, to thereby generate a digital RF signal Sdrf, and then outputs it to the DSP 13. The DSP 13 applies a predetermined digital process on the digital RF signal Sdrf, to generate a digital output signal Sout to an external speaker (if the digital output signal Sout is an audio signal) which is not shown, an external image processor (if the digital output signal Sout is an image. signal) which is not shown, or the like.

In parallel with this, the RF level detection circuit 14 detects an output level of the adjusted RF signal Sarf (actually, a voltage level and the like) to thereby generate a detection signal Slr, and then outputs it to the CPU 18.

On the other hand, the variable amplifier 10 finely adjusts the roughly-adjusted gain of the focus error signal Sfe, in accordance with a later-described control signal Sc5 from the CPU 18 to thereby generate an adjusted focus error signal Safe, and then outputs it to the equalizer 15 and the FE level detection circuit 16.

After that, the equalizer 15 applies a wave form shaping process on the adjusted focus error signal Safe to thereby generate a shaped focus error signal Sad1, which indicates a deviation in a direction perpendicular to the information record surface between the focal points of the light beam B and the respective sub-beams and the position of the information record surface of the optical disc 1.

In parallel with this, the FE level detection circuit 16 detects an output level (actually, a voltage level and the like) of the adjusted focus error signal Safe to thereby generate a detection signal Slf, and then outputs it to the CPU 18.

On the other hand, the variable amplifier 11 finely adjusts the roughly-adjusted gain of the tracking error signal Ste, in accordance with a later-described control signal Sc6 from the CPU 18 to thereby generate an adjusted tracking error signal Sate, and then outputs it to the equalizer 17.

After that, the equalizer 17 applies the wave form shaping process on the adjusted tracking error signal Sate to thereby generate a shaped tracking error signal Sad2 indicative of a deviation in a radial direction of the optical disc 1 between the focal point of the light beam B and a position of a track on the information record surface of the optical disc 1, and then outputs it to the driver 19.

Then, in accordance with the shaped focus error signal Sad1 and the shaped tracking error signal Sad2, the driver 19 generates an actuator drive signal Sdp for driving the objective lens (not shown) in the optical pickup 2 in the direction perpendicular to the information record surface of the optical disc 1 so that the shaped focus error signal Sad1 becomes at a zero level and also for driving the objective lens (not shown) in the optical pickup 2 in the radial direction of the optical disc 1 so that the shaped tracking error signal Sad2 becomes at the zero level, and then outputs it to the optical pickup 2, so as to carry out the focus servo control and the tracking servo control.

In parallel with this, if only the operation of driving the objective lens is insufficient to set the shaped tracking error signal Sad2 at the zero level, the driver 19 generates a motor drive signal Sdm, which is to drive the servo motor 3 so as to move a carriage (not shown) supporting the optical pickup 2 in the radial direction of the optical disc 1, and then outputs it to the servo motor 3.

Moreover, the driver 19 generates the spindle drive signal Sds, which is to drive the spindle motor 20 at the predetermined rotation number and thereby rotate the optical disc 1, and then outputs it to the spindle motor 20.

Next, in accordance with the detection signals Slr and Slf, the CPU 18 generates the control signals Sc1 to Sc6 for controlling the rough and fine adjustments to the gains of the respective signals in the respective pre-amplifiers 6 to 8 and the respective variable amplifiers 9 to 11 by using later-described processes, and then outputs them to the respective pre-amplifiers 6 to 8 and the respective variable amplifier 9 to 11. At this time, the memory 18a stores a later-described parameter x corresponding to the gain roughly adjusted by the pre-amplifiers 6 to 8 and a later-described parameter y corresponding to the gain finely adjusted by the variable amplifier 10, in time series, respectively. Then, the CPU 18 sets and controls the gains while reading out the values of the stored parameters x and y as the above-mentioned data.

In parallel with this, the CPU 18 carries out the control operations with regard to the whole information reproducing apparatus S, such as timing controls of the respective elements constituting the information reproducing apparatus S.

Next, the reproducing process of the information reproducing apparatus S in the first embodiment will be described below with reference to FIGS. 3 to 6.

Figure 3:
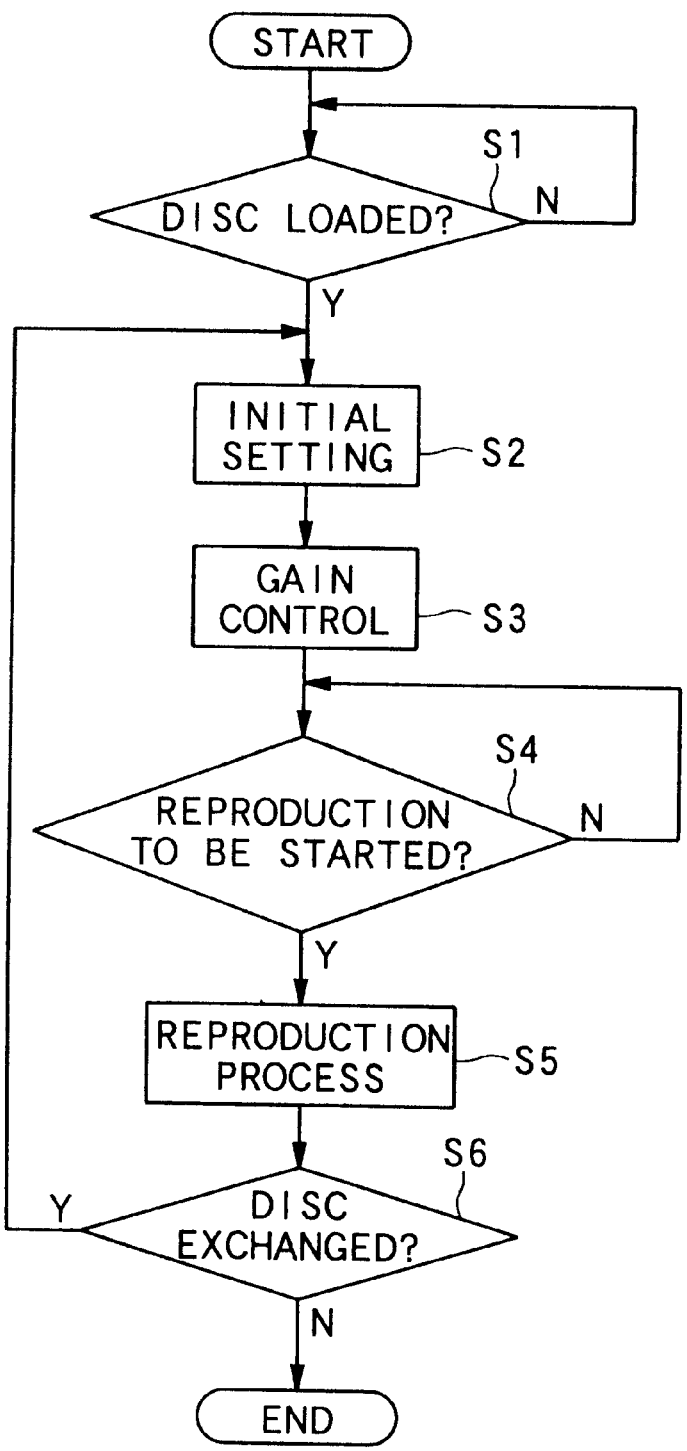
FIG. 3 is a flowchart showing a whole reproducing process in the first embodiment.
Figure 4:
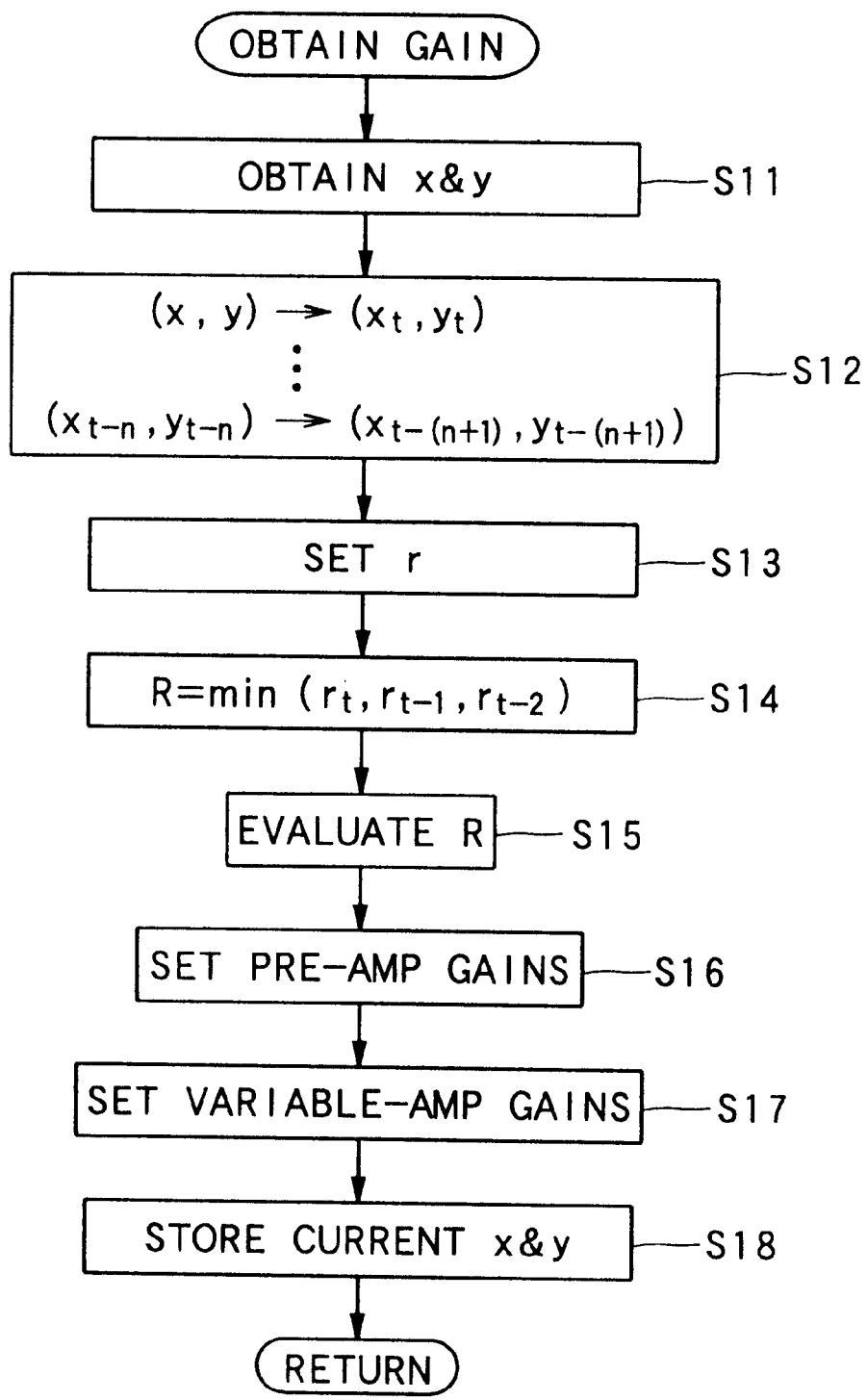
FIG. 4 is a flowchart showing a gain control process in the first embodiment.
Figure 5:
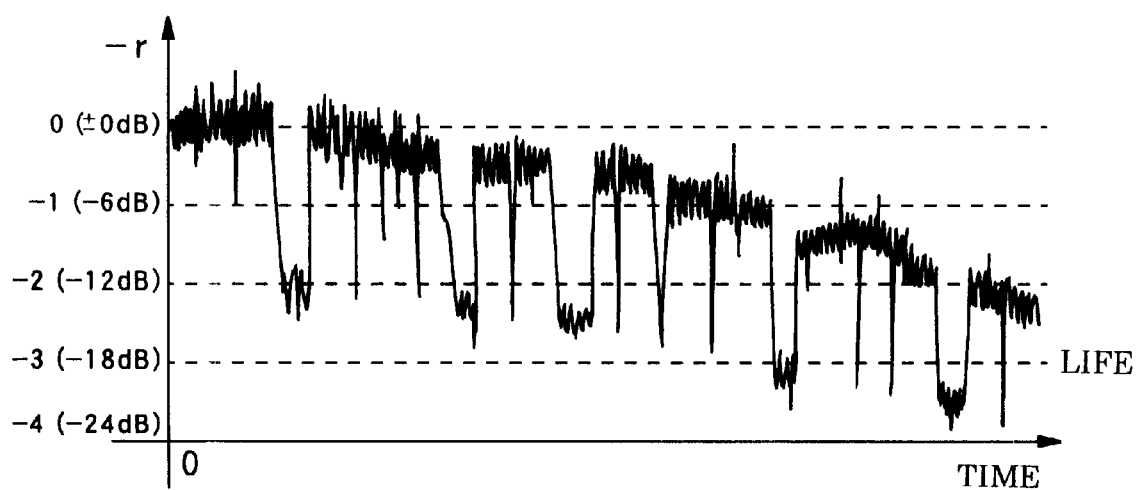
FIG. 5 is a graph exemplifying a temporal change of a correlation parameter.
Figure 6:
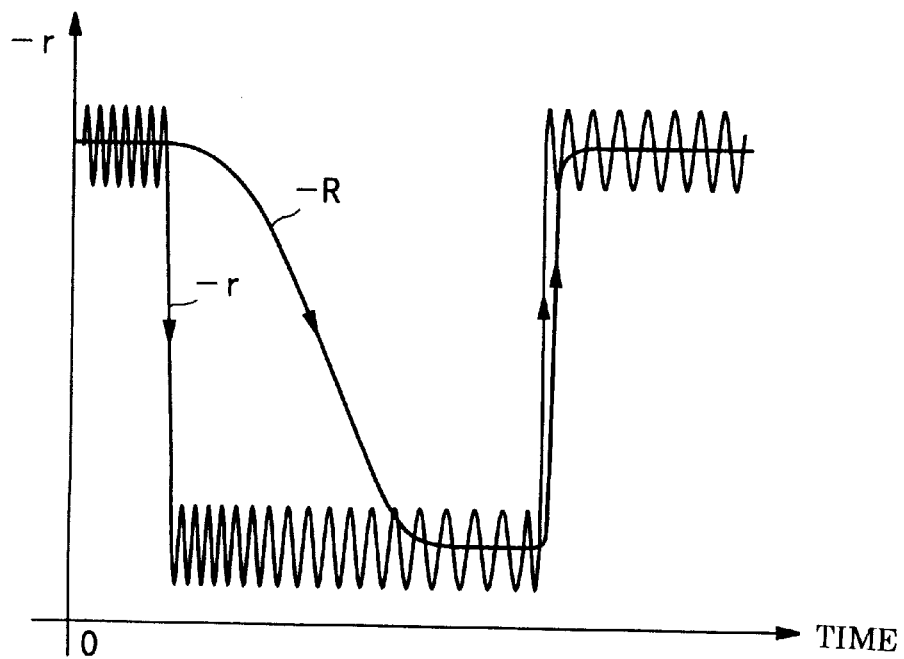
FIG. 6 is a graph exemplifying a temporal change of a change parameter.

FIG. 3 is a flowchart showing the whole of the reproducing process according to the first embodiment. FIG. 4 is a flowchart showing the detailed portions of the gain control process according to the first embodiment. FIG. 5 is a graph exemplifying a temporal change of a correlation parameter. And, FIG. 6 is a graph exemplifying a temporal change of a change parameter.

At first, the whole operations in the reproducing process are described with reference to FIG. 3.

In the reproducing process in the information reproducing apparatus S, it is firstly judged whether or not the optical disc 1 is loaded or inserted in the information reproducing apparatus S (Step S1). If it is not loaded (Step S1: NO), the operational flow waits for loading the optical disc 1 as it is. If it is loaded (Step S1: YES), for example, an operation of determining an attribute of the loaded optical disc 1, an operation of reading out the information for initial setting from the optical disc 1 and the like are carried out by actually irradiating the light beam B onto the optical disc 1. Then, the initial setting of the information reproducing apparatus S as a whole is carried out in accordance with the read out information (Step S2).

Here, the light beam B and the sub-beams are actually irradiated onto the optical disc 1, respectively, at a time of the initial setting at the step S2. Thus, the detection signals Slr and Slf are also generated by the series of operations. When the initial setting is ended (Step S2), the gains for the current rough adjustments in the respective pre-amplifiers 6 to 8 are set in accordance with the values of the detection signals Slr and Slf, as the gain control process in the first embodiment in which the CPU 18 is mainly used. The gains for the current fine adjustments in the respective variable amplifiers 9 to 11 are also set (Step S3).

The parameter corresponding to the gains changed in the rough adjustments in the respective pre-amplifiers 6 to 8 at this time is the parameter x. On the other hand, the parameter corresponding to the gain changed in the fine adjustment in the variable amplifier 10, among the gains changed in the current fine adjustments, is the parameter y.

Here, as a concrete value of the parameter x, for example, the parameter x is set to "0" if respective gains (which are detected from the detection signals Slr and Slf) after the current rough adjustments in the respective pre-amplifiers 6 to 8 are all maintained at the initial values. The parameter x is set to "1" if at least one of the respective gains is increased by 6 dB or more from the initial value. Moreover, the parameter x is set to "2" if at least one of the respective gains is increased by 12 dB or more from the initial values. Also, as a concrete value of the parameter y, for example, the parameter y is set to "0" if a gain (which is detected from the detection signal Slf) after the current fine adjustment in the variable amplifier 10 is not changed from the initial value. The parameter y is set to "1" if the gain is increased by 6 dB or more from the initial value. Moreover, the parameter y is set to "−1" if the gain is decreased by 6 dB from the initial value.

When the current gain control process is ended (Step S3), it is judged whether or not a start of a reproduction is instructed by an operation device (not shown) (Step S4). If it is not instructed (Step S4: NO), the operational flow waits for the instruction. On the other hand, if it is instructed (Step S4: YES), the actual reproducing process is carried out by using the respective elements of the information reproducing apparatus S (Step S5).

Then, it is judged whether or not the optical disc 1 is exchanged after the completion of the reproduction (Step S6). If it is exchanged (Step S6: YES), the operational flow returns back to the step S2, so as to again start the reproducing process. On the other hand, if it is not exchanged (Step S6: NO), the reproducing process is ended as it is.

Here, the processes at the steps S2 and S3 among the above-mentioned respective processes are the process typically referred to as a setup process including them.

Next, the gain control in the current rough adjustments in the respective pre-amplifiers 6 to 8 by the CPU 18 according to the present invention and the gain control in the current fine adjustments in the respective variable amplifiers 9 to 11 (Step S3) will be described below with reference to FIGS. 4 to 6.

In the gain control process of the first embodiment, as shown in FIG. 4, the above-mentioned parameter x which is generated in the gain control processes in the setup process until the previous time and stored in the memory 18a (namely, the parameter x corresponding to the gain at the time of the previous rough adjustment in the pre-amplifiers 6 to 8) and the parameter y (namely, the parameter y corresponding to the gain at the time of the previous fine adjustment in the variable amplifier 10) are firstly read into the CPU 18 (Step S11).

Next, the parameters x and y obtained at the step S11 are newly stored into the memory 18a as respective $x_t$ and $y_t$ (t: natural number). Values of parameters x and y stored at a time of the gain control carried out before the previous time are respectively re-stored in the memory 18a as previous values for each setup (Step S12). Here, the subscript t used at the step S12 indicates the freshness of the values of the stored parameters x and y. So, the values of the newest parameters x and y are set to be ($x_t$, $y_t$). The values of parameters x and y generated two setups ago are set to be ($x_{t-1}$, $y_{t-1}$). The values of parameters x and y generated three setups ago are assumed to be ($x_{t-2}$, $y_{t-2}$). Hereafter, in sequence, the values of parameters x and y generated "n+1" (n: natural number) setups ago are set to be ($x_{t-n}$, $t_{t-n}$). And, the values of parameters x and y generated "n+2" setups ago are set to be ($x_{t-(n+1)}$, $y_{t-(n+1)}$).

Next, when the updating of the content stored in the memory 18a is completed (Step S12), as a correlation parameter which is a parameter indicative of a change of a detected light level of the reflection light of the light beam B and also has a strong correlation with the change of the light reception level, a correlation parameter $r_t$ is calculated by a following equation.

$$r_t = x_t + y_t$$

Moreover, with regard to the respective parameters x and y stored in the memory 18a (i.e., the parameters $x_t$, $x_{t-1}$, $x_{t-2}$, ..., $x_{t-n}$ and $x_{t-(n+1)}$ and the parameters $y_t$, $y_{t-1}$, $y_{t-2}$, ..., $y_{t-n}$ and $y_{t-(n+1)}$) correlation parameters $r_t$, $r_{t-1}$, $r_{t-2}$, ..., $r_{t-n}$ and $r_{t-(n+1)}$ are respectively calculated (Step S13).

Here, a maximum value of the concrete value of the correlation parameter r is "7" according to the above-mentioned definition of the parameters x and y. A minimum value thereof is "−1". If the parameter x is tentatively maintained at the initial value, the correlation parameter of "−1" implies that the variable amplifier 10 needs to increase the gain by 6 dB (since the strength of the reflection light of the light beam B is not increased in long years, the gains for the rough adjustments set by the respective pre-amplifiers 6 to 8 are supposed to be too low in this case). The correlation parameter r of "0" implies that the strength of the reflection light is not changed from the initial value (namely, there is substantially no aged deterioration). The correlation parameter r of "1" implies that the aged deterioration resulting from the contamination of the objective lens and the like mainly may cause the strength of the reflection light to be reduced by −6 dB from the initial value.

On the other hand, as for the aged deterioration of the correlation parameter r itself, its initial value (which is a value of the correlation parameter r at a time of starting the usage of the information reproducing apparatus S) is actually set to "0". Then, in view of the accumulation value from the initial value with regard to a value, which is obtained by changing a sign of the value of the correlation parameter r (i.e., which is the gain of the reproduction RF signal Srf, the focus error signal Sfe or the tracking error signal Ste required to be amplified by the respective pre-amplifiers 6 to 8 and the variable amplifiers 9 to 11), the aged deterioration usually causes the accumulation value to be gradually reduced as shown in FIG. 5. Then, if the accumulation value of the correlation parameter r is decreased by about 12 dB from the initial value, it can be determined that the information reproducing apparatus S reaches the end of its service life at that point and it cannot be used after that. In FIG. 5, there are several portions decreased by about 12 dB from the accumulation value immediately before. This fact implies that the optical disc 1 loaded into the information reproducing apparatus S at that timing is the CD-RW.

The combinations of the parameters x and y and the correlation parameter r set as mentioned above are actually, for example, as shown in a following table.

TABLE

| Level of Light Detection Signal | Kind of Optical Disc | Value of x | Value of y | Value of r |
|---|---|---|---|---|
| greater than −6dB | CD | 0 | 0 | 0 |
|  | CD-R/W, NO.1 | 1 | 1 | 2 |
|  | CD-R/W, NO.2 | 2 | 0 | 2 |
|  | CD-R/W, NO.3 | 1 | 0 | 1 |
| greater than −12dB, and not greater than −6dB | CD, NO.1 | 0 | 1 | 1 |
|  | CD, NO.2 | 1 | 1 | 2 |
|  | CD-R/W, NO.1 | 2 | 0 | 2 |
|  | CD-R/W, NO.2 | 1 | 0 | 1 |
| not greater than −12dB | CD, NO.1 | 1 | 1 | 2 |
|  | CD, NO.2 | 2 | 0 | 2 |
|  | CD, NO.3 | 2 | 1 | 1 |
|  | CD-R/W | Reproduction Impossible | | |

After the respective correlation parameters r are calculated (Step S13), three correlation parameters r i.e., a newest correlation parameter $r_t$ and two correlation parameters $r_{t-1}$, $r_{t-2}$ corresponding to previous two setups when they are counted from the newest correlation parameters $r_t$ are used from among the respective correlation parameters r, so as to newly set a change parameter R which is a parameter having the strongest correlation with the change of the strength of the reflection light of the light beam B, as follows (Step S14).

$$R = \min(r_t, r_{t-1}, r_{t-2})$$

Here, the "min $(r_t, r_{t-1}, r_{t-2})$" in the above equation indicates such an operation that a correlation parameter r having a minimum value is selected from among the correlation parameters r contained in the small parenthesis to be set as the change parameter R. If the change parameter R is set in this way, in case that the value obtained by changing the sign of the correlation parameter r contributing to the ground or base to calculate the change parameter R is drastically decreased and further drastically increased in time series as shown in FIG. 6, the value of the change parameter R is gently decreased in its decrease direction. On the other hand, in its increase direction, the value is drastically increased (sensitively associated with the change of the correlation parameter r). Since the gains of the respective amplifies are controlled in accordance with the change parameter R changed in this way, it is possible to optimally control the gains of the respective amplifiers while indicating an average value of the correlation parameter r and preventing the respective servo control systems from oscillating due to the drastic increase of the gain.

Next, when the value of the change parameter R at that time is determined (Step S14), the value is evaluated (Step S15). The above-mentioned control signals Sc1 to Sc3 are generated so as to control the gains for the rough adjustments in the respective pre-amplifiers 6 to 8 on the basis of this evaluation, and they are outputted to the respective pre-amplifiers 6 to 8 (Step S16). Moreover, the control signals Sc4 to Sc6 are generated so as to finely adjust the gains on the basis of the gains roughly adjusted by the pre-amplifiers 6 to 8, and they are outputted to the variable amplifiers 9 to 11 (Step S17). The parameters x and y corresponding to the gains after the current gain control process are stored into the memory 18a (Step S18). Then, the operational flow proceeds to the original step S4 (in FIG. 3).

As the processes at the steps S15 and S16, for example, when the value of the change parameter R calculated at the step S14 is "0" (for example, in a case of the change parameter R=min(0,0,0)=0 or in a case of the change parameter R=min(0,1,1)=0 or the like), it is evaluated that the change is not to the extent of requiring the amplifying processes in the respective pre-amplifiers 6 to 8 although the strength is slightly dropped or since the strength of the reflection light of the light beam B is maintained at the initial value (Step S15). So, the control signals Sc1 to Sc3 are outputted such that the gains of the respective pre-amplifiers 6 to 8 are maintained at the initial values (Step S16).

When the value of the change parameter R calculated at the step S14 is "1" (for example, in a case of the change parameter R=min(1,1,1)=1 or the like), it is evaluated that the amplifying processes at a first stage is necessary in the respective pre-amplifiers 6 to 8 since the aged deterioration of the objective lens mainly causes the strength of the reflection light of the light beam B to be dropped (Step S15). So, the control signals Sc1 to Sc3 are outputted so as to increase the gains in the respective pre-amplifiers 6 to 8, by 6 dB for example (Step S16).

Moreover, when the value of the change parameter R calculated at the step S14 is "0" (for example, in a case of the change parameter R=min(0,2,0)=0 or the like), it is evaluated that, although the strength of the reflection light of the light beam B is transiently dropped since the CD-RW was reproduced as the optical disc 1 two times before, it returns to the original strength in a previous CD reproduction (namely, there is no aged deterioration) (Step S15). So, the control signals Sc1 to Sc3 are outputted such that the gains in the respective pre-amplifiers 6 to 8 are maintained at the initial values (Step S16).

Furthermore, when the value of the change parameter R calculated at the step S14 is "2" (for example, in a case of the change parameter R=min(2,2,2)=2 or the like), it is evaluated that only the CD-RW is reproduced as the optical disc 1 since at least three times earlier and there is a high possibility that the CD-RW is also reproduced at a current time, or it is evaluated that the amplifying processes at a second state is necessary in the respective pre-amplifiers 6 to 8 since the strength of the reflection light of the light beam B is extremely dropped by the aged deterioration of the objective lens (Step S15). So, the control signals Sc1 to Sc3 are outputted so as to increase the gains in the respective pre-amplifiers 6 to 8 by 12 dB (Step S16).

As mentioned above, according to the gain control process in the information reproducing apparatus S of the first embodiment, the parameters x and y accumulated in the time series are used to roughly adjust the current gain, and the gain is finely adjusted in accordance with the result of the rough adjustment. Thus, the gain can be finely adjusted after the rough adjustment under the prediction of the future change of the strength of the reflection light. Therefore, the adjusted value in the previous rough adjustment is used as it is to carry out the current rough adjustment to further carry out the fine adjustment, in many cases. Hence, it is possible to effectively prevent the increase of the gain adjustment time duration resulting from the fact that the adjusted value in the rough adjustment is frequently changed for each rough adjustment while keeping the adjustment accuracy, and to thereby quickly proceed to the reproducing process.

The correlation parameter r having the correlation with the strength of the reflection light from the optical disc 1 and the change parameter R indicative of the aged deterioration thereof are respectively generated to predict and set the current gain. Thus, it is possible to further accurately predict the current gain to thereby prevent the increase of the gain adjustment time duration resulting from the change of the strength of the reflection light.

Moreover, the correlation parameter r and the change parameter R are generated in accordance with the focus error signal Sfe and the reproduction Rf signal Srf detected from the optical disc 1. Thus, the change of the gain to be adjusted, which results from the aged deterioration of the characteristic of the reflection light, can be grasped further accurately to quickly adjust the change.

In the first embodiment, the currently-detected detection signals Slr and Slf as well as the currently-generated parameters x and y are used to determine the correlation parameter r and the change parameter R to thereby set the current gains to be roughly adjusted in the pre-amplifiers 6 to 8. However, other than this set, the correlation parameter r and the change parameter R may be calculated when the previous parameters x and y are generated. Then, their values may be used as it is as the current correlation parameter r and change parameter R to then set the gains to be roughly adjusted in the pre-amplifiers 6 to 8.

In this case, it is not necessary to again set the change parameter R and the correlation parameter r in the current rough adjustments in the pre-amplifiers 6 to 8. Thus, the current gain adjustment time duration can be further shortened.

In this configuration, the previous correlation parameter r and the previous change parameter R are transiently stored in the memory 18a.

Moreover, in the first embodiment, the output level of the focus error signal Sfe and the output level of the reproduction RF signal Srf are used from among the tracking error signal Ste, the focus error signal Sfe and the reproduction RF signal Srf generated by receiving the reflection light of the light beam B, to set the correlation parameter r and the change parameter R and accordingly control the gains in the pre-amplifiers 6 to 8. However, other than this control, all the three signals may be used to carry out the above-mentioned processes. Alternatively, among the combinations of selecting and using two signals from the three signals, a combination other than the combination including the reproduction RF signal Srf and the focus error signal Sfe may be used to carry out the above-mentioned processes. Moreover, only one signal of the three signals may be used to carry out the above-mentioned processes. Any of these cases can attain the effect more or less similar to that of the first embodiment.

(II) Second Embodiment

A second embodiment of another embodiment according to the present invention will be described below with reference to FIG. 7.

In the first embodiment, all or a part of the tracking error signal Ste, the focus error signal Sfe and the reproduction RF signal Srf generated at the previous time by receiving the reflection light of the light beam B are used to set the previous parameters x and y. Moreover, the previous parameters x and y are used to control the current gains in the pre-amplifiers 6 to 8. In contrast, in an information reproducing apparatus of the second embodiment, a gain controlled in the focus servo control using the focus error signal Sfe and the output level of the reproduction RF signal Srf in a previous gain adjusting process are used to set previous parameters x and y to accordingly control the current gains in the pre-amplifiers 6 to 8. The configuration of the second embodiment is realized by a fact that the gain controlled in the focus servo control has a strong correlation with a change of the reflection light of the light beam B, similarly to the output level of the reproduction RF signal Srf.

Figure 7:
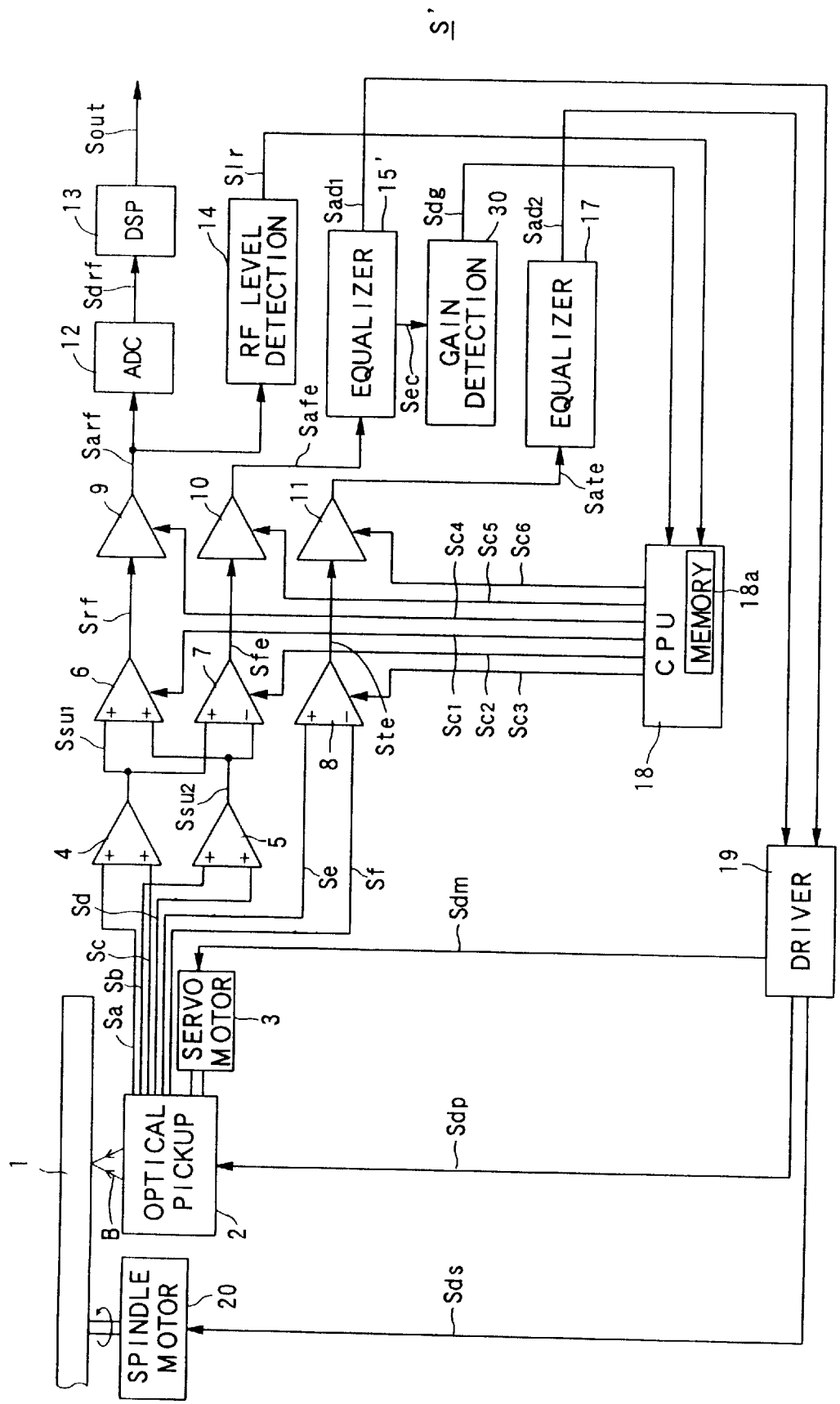
FIG. 7 is a block diagram showing a schematic configuration of an information reproducing apparatus according to a second embodiment.

In the information reproducing apparatus of the second embodiment shown in FIG. 7, the same constitutional elements as those in the information reproducing apparatus S of the first embodiment shown in FIG. 1 carry the same reference numerals, and the detailed explanations thereof are omitted.

Namely, as shown in FIG. 7, an information reproducing apparatus S' of the second embodiment has a gain detection circuit 30, which outputs a gain detection signal Sdg indicative of a value of the gain on the basis of the gain signal Sec corresponding to the gain in the servo loop in the focus servo control outputted by an equalizer 15', instead of the FE level detection circuit 16 in the information reproducing apparatus S of the first embodiment.

If an external disturbance signal having a predetermined frequency is applied to the servo loop, the gain detection circuit 30 outputs the gains detected on the servo loop before and after the application, as the gain detection signal Sdg, to the CPU 18. At this time, the two gains have the strong correlation with the change of the reflection light of the light beam B.

Then, the CPU 18 uses the gain detection signal Sdg and the above-mentioned detection signal Slr to thereby generate the above-mentioned control signals Sc1 to Sc6 for controlling the rough and fine adjustments to the gains of the respective signals in the respective pre-amplifiers 6 to 8 and the respective variable amplifiers 9 to 11, and then outputs them to the respective pre-amplifiers 6 to 8 and the respective variable amplifiers 9 to 11.

More actually, in the gain control process (refer to the step S3 in FIG. 4), the gains for the current rough adjustments in the respective pre-amplifiers 6 to 8 are set on the basis of the values in the detection signal Slr and the gain detection signal Sdg in the previous gain control, and the gains for the current fine adjustments in the respective variable amplifiers 9 to 11 are set. At this time, a parameter corresponding to the gains changed at the previous rough adjustments in the respective pre-amplifiers 6 to 8 are set to be the parameter x. On the other hand, among the gains changed in the fine adjustments, a parameter corresponding to the gain changed at the previous fine adjustment in the variable amplifier 10 is set to be the parameter y. Accordingly, the current gain control process is carried out (refer to FIGS. 2 and 3).

Here, the correlation parameter r and the change parameter R respectively generated by using the thus-set parameters x and y also have the properties similar to those of the first embodiment.

The other processes in the information reproducing apparatus S' are similar to the processes in the information reproducing apparatus S of the first embodiment. Thus, the explanations of the detailed portions are omitted.

Even the above-mentioned gain control process in the information reproducing apparatus S' of the second embodiment can provide the effects similar to those in the information reproducing apparatus S of the first embodiment and can also grasp and adjust the change of the gain to be adjusted due to the aged deterioration of the characteristic of the reflection light.

(III) Third Embodiment

Figure 8:
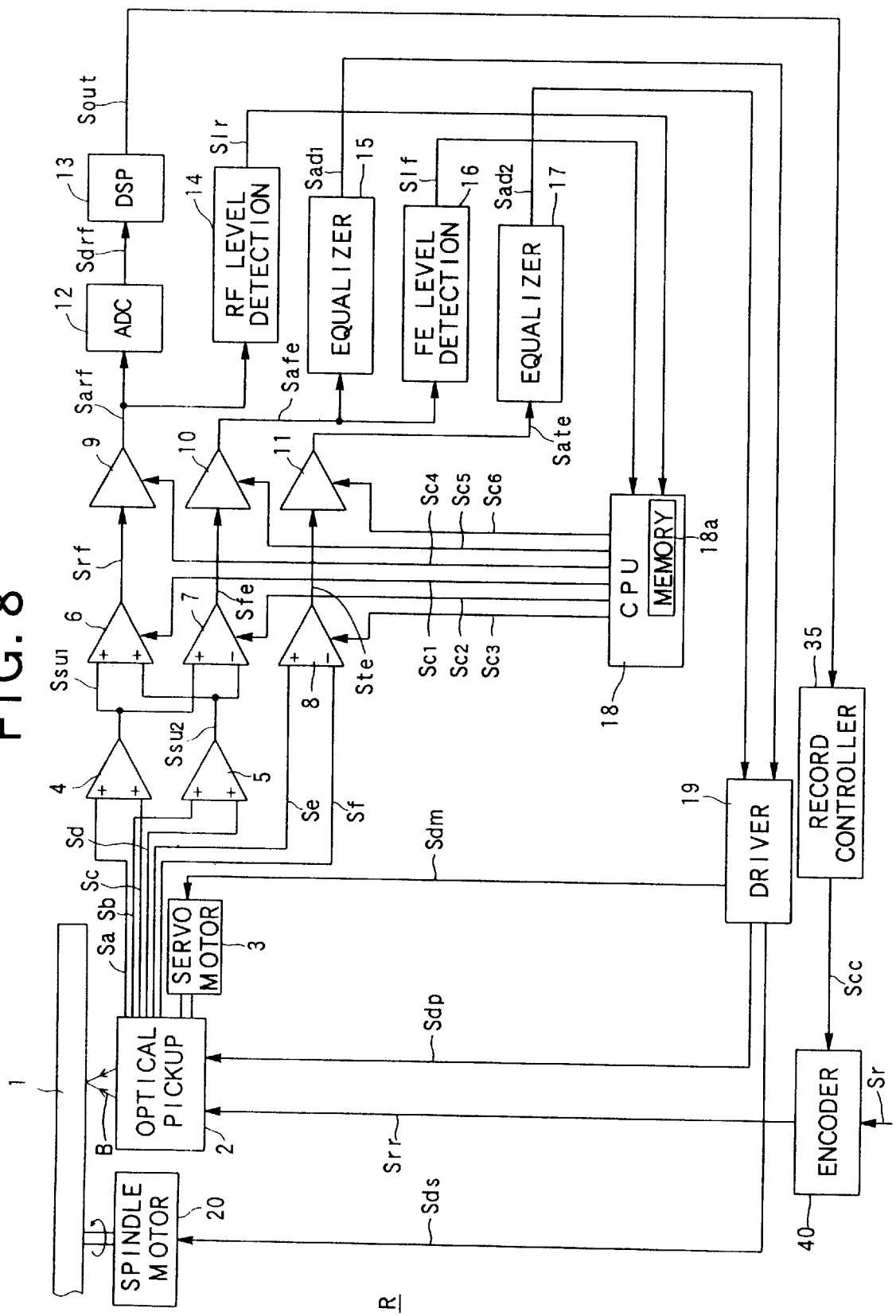
FIG. 8 is a block diagram showing a schematic configuration of an information recording apparatus according to a third embodiment.

A third embodiment of another embodiment according to the present invention will be described below with reference to FIG. 8. FIG. 8 is a block diagram showing the schematic configuration of an information recording apparatus according to the third embodiment.

In the first and second embodiments, the case is described in which the present invention is applied to the information reproducing apparatus for reproducing the information recorded on the optical disc 1. However, other than that case, if the optical disc 1 is the above-mentioned CD-RW, the present invention can be applied to an information recording apparatus which detects a record control signal recorded in advance on the CD-RW and then records the information onto the optical disc 1 that is the CD-RW, in accordance with the detected record control information.

This third embodiment is described with reference to FIG. 8, with regard to the case corresponding to the information reproducing apparatus S of the first embodiment.

In addition to the configuration of the information reproducing apparatus S in the first embodiment, an information recording apparatus R of the third embodiment is provided with: a record controller 35 for extracting record control information from a digital output signal Sout (in which the record control information is included) outputted from the DSP 13 and then outputs a record control signal Scc (which includes the address information on the optical disc 1 and the like) to an encoder 40; and the encoder 40 serving as a recording device for encoding record information Sr to be recorded, which is inputted from the external portion in accordance with the record control signal Scc, to thereby generate an encode signal Srr, and outputs it to a laser diode (not shown) in the optical pickup 2, and then controls it. An oscillation strength of the laser diode and the like in the optical pickup 2 is controlled in accordance with this encode signal Srr. Thus, an information pit corresponding to the record information Sr is formed on a position of the optical disc 1 indicated by the address information within the record control signal Scc. Hence, the record information Sr is recorded.

In FIG. 8, the same constitutional elements as those in the information reproducing apparatus S of the first embodiment shown in FIG. 1 carry the same reference numerals, and the detailed explanations thereof are omitted.

As mentioned above, according to the operations of the information recording apparatus R of the third embodiment, in addition to the effects due to the operations of the information reproducing apparatus S of the first embodiment, in case of recording the information onto the optical disc 1, it is possible to shorten the gain adjustment time duration and also possible to quickly record the information.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-330022 filed on Nov. 19, 1998 including the specification, claims, drawings and summary is incorporated herein by reference in its entirety.

What is claimed is:

1. A gain controlling apparatus comprising:
   a roughly adjusting device for roughly adjusting a gain of a generation signal, which is generated on the basis of a light detection signal obtained by receiving a reflection light of a light beam from an information recording medium;
   a finely adjusting device for finely adjusting the gain on the basis of a result of roughly adjusting the gain by said roughly adjusting device;
   a memory device for storing a plurality of values for adjusting the gain generated during a previous occasion of gain adjustment in time series; and
   a controlling device for controlling said roughly adjusting device to roughly adjust the gain at a current occasion of gain adjustment on the basis of the respective stored values for adjusting the gain and also controlling said finely adjusting device to finely adjust the gain on the basis of a result of roughly adjusting the gain at the current occasion by said roughly adjusting device, wherein
   said controlling device comprises a predicting device for predicting a current adjustment value, which is an adjusted value for the gain roughly adjusted at the current occasion by said roughly adjusting device, and
   said controlling device controls said roughly adjusting device to roughly adjust the gain at the current occasion on the basis of the predicted current adjustment value.

2. The gain controlling apparatus according to claim 1, wherein the current adjustment value is predicted when adjusting the gain at the previous occasion.

3. The gain controlling apparatus according to claim 1, wherein
   (i) the gain is changed in conjunction with a change of a characteristic of the reflection light,
   (ii) said predicting device comprises:
      a correlation parameter generating device for generating a correlation parameter having a correlation with the reflection light by using a correlation generation signal, which is the generation signal having a characteristic correlated with the characteristic of the reflection light; and
      a change parameter generating device for generating a change parameter indicative of an aged change of the characteristic of the reflection light by using each correlation parameter corresponding to the respective one of the stored values for adjusting the gain, and
   (iii) said predicting device predicts the current adjustment value for the gain, on the basis of the generated change parameter.

4. A gain controlling apparatus according to claim 3, wherein
   said information recording medium is recorded with information by forming a record track; and
   the correlation generation signal is at least one of a detection signal corresponding to the information and an error signal indicative of a deviation from the record track at an irradiation position of the light beam on said information recording medium.

5. A gain controlling apparatus according to claim 4, wherein
   said information recording medium is shaped in a disc, and
   the error signal is at least one of a tracking error signal indicative of a deviation from the record track in a radial direction of said information recording medium at the irradiation position and a focus error signal indicative of a deviation from the record track in a direction perpendicular to said information recording medium at the irradiation position.

6. A gain controlling apparatus according to claim 4, wherein
   said information recording medium is shaped in a disc, and
   the error signal is at least one of (i) a first gain signal which indicates a gain in a tracking servo control using a tracking error signal indicative of a deviation from the record track in a radial direction of said information recording medium at the irradiation position and (ii) a second gain signal which indicates a gain in a focus servo control using a focus error signal indicative of a deviation from the record track in a direction perpendicular to said information recording medium at the irradiation position.

7. An information reproducing apparatus comprising
   (i) a gain controlling apparatus comprising:
      a roughly adjusting device for roughly adjusting a gain of a generation signal, which is generated on the basis of a light detection signal obtained by receiving a reflection light of a light beam from an information recording medium;
      a finely adjusting device for finely adjusting the gain on the basis of a result of roughly adjusting the gain by said roughly adjusting device;
      a memory device for storing a plurality of values for adjusting the gain generated during a previous occasion of gain adjustment in time series; and
      a controlling device for controlling said roughly adjusting device to roughly adjust the gain at a current occasion of gain adjustment on the basis of the respective stored values for adjusting the gain and also controlling said finely adjusting device to finely adjust the gain on the basis of a result of roughly adjusting the gain at the current occasion by said roughly adjusting device, wherein
      said controlling device comprises a predicting device for predicting a current adjustment value, which is an adjusted value for the gain roughly adjusted at the current occasion by said roughly adjusting device, and said controlling device controls said roughly adjusting device to roughly adjust the gain at the current occasion on the basis of the predicted current adjustment value, (ii) an optical pickup device for irradiating the light beam onto said information recording medium and receiving the reflection light to thereby output the light detection signal, (iii) a signal generating device for generating the generation signal on the basis of the light detection signal outputted from said optical pickup device, and (iv) a reproduction controlling device for controlling a reproduction of the information in accordance with the generation signal, the gain of which is roughly and finely adjusted.

8. An information recording apparatus comprising
(i) a gain controlling apparatus comprising:
a roughly adjusting device for roughly adjusting a gain of a generation signal, which is generated on the basis of a light detection signal obtained by receiving a reflection light of a light beam from an information recording medium;
a finely adjusting device for finely adjusting the gain on the basis of a result of roughly adjusting the gain by said roughly adjusting device;
a memory device for storing a plurality of values for adjusting the gain generated during a previous occasion of gain adjustment in time series; and
a controlling device for controlling said roughly adjusting device to roughly adjust the gain at a current occasion of gain adjustment on the basis of the respective stored values for adjusting the gain and also controlling said finely adjusting device to finely adjust the gain on the basis of a result of roughly adjusting the gain at the current occasion by said roughly adjusting device, wherein
said controlling device comprises a predicting device for predicting a current adjustment value, which is an adjusted value for the gain roughly adjusted at the current occasion by said roughly adjusting device, and
said controlling device controls said roughly adjusting device to roughly adjust the gain at the current occasion on the basis of the predicted current adjustment value, (ii) an optical pickup device for irradiating the light beam onto said information recording medium and receiving the reflection light to thereby output the light detection signal, (iii) a signal generating device for generating the generation signal on the basis of the light detection signal outputted by said optical pickup device, (iv) a reproducing device for reproducing the information from said information recording medium on the basis of the generation signal, the gain of which is roughly and finely adjusted, and (v) a recording device for processing record information, which is to be recorded onto said information recording medium, on the basis of the reproduced information and recording the processed record information onto said information recording medium.

9. A gain controlling method comprising:
a roughly adjusting process of roughly adjusting a gain of a generation signal, which is generated on the basis of a light detection signal obtained by receiving a reflection light of a light beam from an information recording medium;

a finely adjusting process of finely adjusting the gain on the basis of a result of roughly adjusting the gain by said roughly adjusting process;

a storing process of storing into a memory device a plurality of values for adjusting the gain generated during a previous occasion of gain adjustment in time series; and a controlling process of controlling said roughly adjusting process to roughly adjust the gain at a current occasion of gain adjustment on the basis of the respective stored values for adjusting the gain and also controlling said finely adjusting process to finely adjust the gain on the basis of a result of roughly adjusting the gain at the current occasion by said roughly adjusting process, wherein said controlling process comprises a predicting process of predicting a current adjustment value, which is an adjusted value for the gain roughly adjusted at the current occasion by said roughly adjusting process, and said controlling process controls said roughly adjusting process to roughly adjust the gain at the current occasion on the basis of the predicted current adjustment value.

10. The gain controlling method according to claim 9, wherein the current adjustment value is predicted when adjusting the gain at the previous occasion.

11. The gain controlling method according to claim 9, wherein
(i) the gain is changed in conjunction with a change of a characteristic of the reflection light,
(ii) said predicting process comprises:
a correlation parameter generating process of generating a correlation parameter having a correlation with the reflection light by using a correlation generation signal, which is the generation signal having a characteristic correlated with the characteristic of the reflection light; and
a change parameter generating process of generating a change parameter indicative of an aged change of the characteristic of the reflection light by using each correlation parameter corresponding to the respective one of the stored values for adjusting the gain, and
(iii) said predicting process predicts the current adjustment value for the gain, on the basis of the generated change parameter.

12. A gain controlling method according to claim 11, wherein
said information recording medium is recorded with information by forming a record track; and
the correlation generation signal is at least one of a detection signal corresponding to the information and an error signal indicative of a deviation from the record track at an irradiation position of the light beam on said information recording medium.

13. A gain controlling method according to claim 12, wherein
said information recording medium is shaped in a disc, and
the error signal is at least one of a tracking error signal indicative of a deviation from the record track in a radial direction of said information recording medium at the irradiation position and a focus error signal indicative of a deviation from the record track in a direction perpendicular to said information recording medium at the irradiation position.

14. A gain controlling method according to claim 12, wherein said information recording medium is shaped in a disc, and the error signal is at least one of (i) a first gain signal which indicates a gain in a tracking servo control using a tracking error signal indicative of a deviation from the record track in a radial direction of said information recording medium at the irradiation position and (ii) a second gain signal which indicates a gain in a focus servo control using a focus error signal indicative of a deviation from the record track in a direction perpendicular to said information recording medium at the irradiation position.

15. An information reproducing method comprising (i) a gain controlling method comprising:

a roughly adjusting process of roughly adjusting a gain of a generation signal, which is generated on the basis of a light detection signal obtained by receiving a reflection light of a light beam from an information recording medium;

a finely adjusting process of finely adjusting the gain on the basis of a result of roughly adjusting the gain by said roughly adjusting process;

a storing process of storing into a memory device a plurality of values for adjusting the gain generated during a previous occasion of gain adjustment in time series; and a controlling process of controlling said roughly adjusting process to roughly adjust the gain at a current occasion of gain adjustment on the basis of the respective stored values for adjusting the gain and also controlling said finely adjusting process to finely adjust the gain on the basis of a result of roughly adjusting the gain at the current occasion by said roughly adjusting process, wherein said controlling process comprises a predicting process of predicting a current adjustment value, which is an adjusted value for the gain roughly adjusted at the current occasion by said roughly adjusting process, and said controlling process controls said roughly adjusting process to roughly adjust the gain at the current occasion on the basis of the predicted current adjustment value, (ii) an optical pickup process of irradiating the light beam onto said information recording medium and receiving the reflection light to thereby output the light detection signal, (iii) a signal generating process of generating the generation signal on the basis of the light detection signal outputted by said optical pickup process, and (iv) a reproduction controlling process of controlling a reproduction of the information in accordance with the generation signal, the gain of which is roughly and finely adjusted.

16. An information recording method comprising (i) a gain controlling method comprising:

a roughly adjusting process of roughly adjusting a gain of a generation signal, which is generated on the basis of a light detection signal obtained by receiving a reflection light of a light beam from an information recording medium;

a finely adjusting process of finely adjusting the gain on the basis of a result of roughly adjusting the gain by said roughly adjusting process;

a storing process of storing into a memory device a plurality of values for adjusting the gain generated during a previous occasion of gain adjustment in time series; and a controlling process of controlling said roughly adjusting process to roughly adjust the gain at a current occasion of gain adjustment on the basis of the respective stored values for adjusting the gain and also controlling said finely adjusting process to finely adjust the gain on the basis of a result of roughly adjusting the gain at the current occasion by said roughly adjusting process, wherein said controlling process comprises a predicting process of predicting a current adjustment value, which is an adjusted value for the gain roughly adjusted at the current occasion by said roughly adjusting process, and said controlling process controls said roughly adjusting process to roughly adjust the gain at the current occasion on the basis of the predicted current adjustment value, (ii) an optical pickup process of irradiating the light beam onto said information recording medium and receiving the reflection light to thereby output the light detection signal, (iii) a signal generating process of generating the generation signal on the basis of the light detection signal outputted by said optical pickup process, (iv) a reproducing process of reproducing the information from said information recording medium on the basis of the generation signal, the gain of which is roughly and finely adjusted, and (v) a recording process of processing record information, which is to be recorded onto said information recording medium, on the basis of the reproduced information and recording the processed record information onto said information recording medium.

* * * * *